April 7, 1936.                P. FROST                2,036,326
                              CAMERA
                         Filed Nov. 6, 1934

Inventor:
Paul Frost,
By    Attorney
Philip S. Hopkins

Patented Apr. 7, 1936

2,036,326

UNITED STATES PATENT OFFICE 2,036,326

CAMERA

Paul Frost, Munich-Neuharlaching, Germany, assignor to Agfa Ansco Corporation, Binghamton, N. Y., a corporation of New York Application November 6, 1934, Serial No. 751,777
In Germany November 10, 1933

4 Claims. (Cl. 95—31)

This invention relates to a photographic camera and more particularly to a roll film camera.

One of its objects is to provide a roll film camera with a film-transport mechanism which is coupled with the shutter. Another object is such a device which is simple in construction and efficient. Further objects will be seen from the detailed specification following hereafter.

Figure 1:
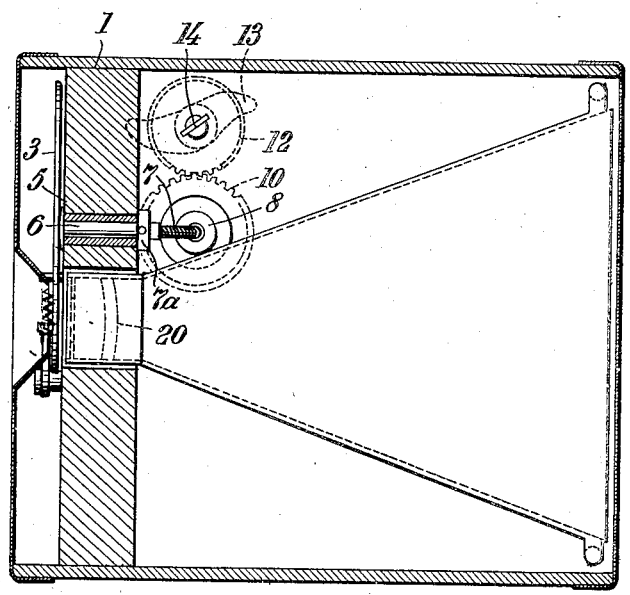
Figure 2:
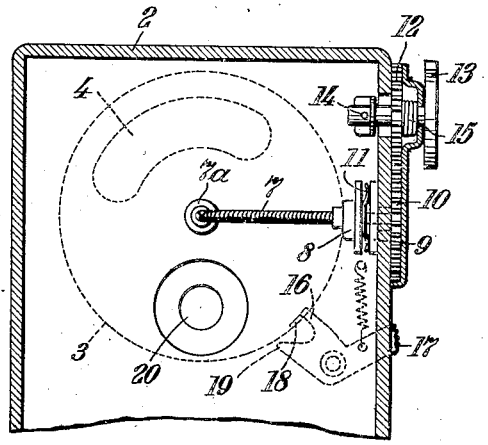

Reference is made to the accompanying drawing in which:

Fig. 1 represents a longitudinal section of a box camera provided with a shutter which is coupled with the film-transport mechanism, and Fig. 2 is a rear view of the camera after removal of the lid.

According to my invention the tension spring of the shutter is connected with the film-transport mechanism and preferably consists of a helical spring. A simple circular slider serves as the shutter. In order to avoid an excess strain on the shutter-spring, a friction coupling is inserted between the winding-up coil and the spring, which is adjusted in such a manner, that the helical spring is engaged by the film key only until the spring of the shutter is sufficiently tensioned. Instead of this sliding coupling, it is also possible to use a constant gear ratio which corresponds to the height of an image, or the film may tension the spring of the shutter while being advanced by the height of one image.

The advantages of this new shutter reside in the fact, that the shutter disk, which is provided with an aperture, does not carry out a pendulum movement, as has hitherto been generally usual, but is always moved in the same direction. This is of importance inasmuch as with pendulous shutter disks, a wire or a time releaser can be employed only with difficulties and if such a releaser shall be used, a special masking device must be provided for the return movement of the circular slider. A shutter provided with a disk turning in one direction, however, is more efficient, and more snap-shot exposures can be made therewith by regulating the power of friction and the more or less great tension of the shutter spring, or by inserting before the shutter disk a second masking disk by means of which the dimension of the lens aperture and the time of exposure may be adjusted.

The shutter disk 3 is mounted in the intermediate wall 1 of the box camera 2 and is provided with a kidney shaped aperture 4. The flange 7a of the helical spring 7 is connected with the rear end of the axle 6 which bears the shutter disk, and is journalled in the bush 5. The other end of the helical spring 7 also is provided with a flange 8 which by means of a friction spring 11 is pressed against a disk 9 driven by a toothed wheel. The toothed wheel 10 engages the toothed wheel 12 which is driven by the film key 13. The portion of the film key which engages the film spool, is designated with numeral 14, and the locking means is designated with numeral 15.

In embodiment shown in the accompanying drawing to which the invention is, however, not limited, only one velocity of shutter movement is provided for. The shutter disk 3 is maintained in the tensioned state by the arm 16 of the release lever 17. A stop pin 18 is attached to the shutter disk. The arm 19 of the release lever 17 is preferably mounted in an elastic manner, in order to catch shutter disk 3 after passing the aperture 4 before the lens 20.

The apparatus is actuated in the following manner:

After inserting the film spools, the winding-up spool is turned until number 1 appears in the number window. In this case, the spring 7 of the shutter is tensioned, since the turning movement of the film key is transmitted to the tension spring of the shutter by means of the toothed wheels 12, 10 and the coupling 8, 9, 11. As soon as the spring is sufficiently tensioned, the coupling 8, 9, 11 begins to slide. It is of course possible to construct the friction coupling 8, 9, 11 in an adjustable manner in order to tension thereby the spring 7 to a more or less great extent and thereby to vary the shutter speed. The same effect may also be attained by varying the aperture 4.

What I claim is:

1. In a photographic camera in combination, a casing, means for advancing a light-sensitive material after each exposure, a shutter mounted in said casing, a helical spring for tensioning said shutter, means for coupling said helical spring with said means for advancing said light-sensitive material, and means for tensioning said helical spring to a predetermined amount.

2. In a photographic camera in combination, a casing, means for advancing a light-sensitive material after each exposure, a shutter consisting of a rotatable disk provided with an aperture, mounted in said casing, a helical spring for tensioning said shutter, means for coupling said helical spring with said means for advancing said light-sensitive material, and means for tensioning said helical spring to a predetermined amount.

3. In a photographic camera in combination, a casing, means for advancing a light-sensitive material after each exposure, a shutter mounted in said casing, a helical spring for tensioning said shutter, means for resiliently coupling said helical spring with said means for advancing said light-sensitive material, and means for tensioning said helical spring to a predetermined amount.

4. In a photographic camera in combination, a casing, means for advancing a light-sensitive material after each exposure, a shutter consisting of a rotatable disk provided with an aperture, mounted in said casing, a helical spring for tensioning said shutter, means for resiliently coupling said helical spring with said means for advancing said light-sensitive material, and means for tensioning said helical spring to a predetermined amount.

PAUL FROST.